United States Patent
Huang et al.

(10) Patent No.: US 9,634,757 B2
(45) Date of Patent: Apr. 25, 2017

(54) VICINITY-BASED UNDOCKING FOR A WIRELESS DOCKING APPLICATION

(71) Applicant: QUALCOMM Incorporated, San Diego, CA (US)

(72) Inventors: Xiaolong Huang, San Jose, CA (US); Xiaodong Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 14/206,953

(22) Filed: Mar. 12, 2014

(65) Prior Publication Data

US 2014/0370810 A1    Dec. 18, 2014

Related U.S. Application Data

(60) Provisional application No. 61/835,370, filed on Jun. 14, 2013.

(51) Int. Cl.
| | |
|---|---|
| H04B 7/00 | (2006.01) |
| H04B 7/26 | (2006.01) |
| H04M 1/725 | (2006.01) |
| H04W 48/02 | (2009.01) |

(52) U.S. Cl.
CPC ............ *H04B 7/26* (2013.01); *H04M 1/7253* (2013.01); *H04W 48/02* (2013.01)

(58) Field of Classification Search
CPC ..... H04B 17/318; H04B 7/26; H04M 1/7253; H04W 76/02; H04W 48/02; G06F 1/1632
USPC ........................................................ 455/41.2
See application file for complete search history.

(56) References Cited

U.S. PATENT DOCUMENTS

| | | |
|---|---|---|
| 8,254,992 B1 | 8/2012 | Ashenbrenner et al. |
| 2009/0197604 A1* | 8/2009 | Gupta ................. H04W 72/005 455/436 |
| 2009/0285124 A1* | 11/2009 | Aguirre ................ H04L 45/122 370/255 |

(Continued)

FOREIGN PATENT DOCUMENTS

| | | |
|---|---|---|
| WO | 2013076625 A1 | 5/2013 |
| WO | WO2013076625 * | 5/2013 |

OTHER PUBLICATIONS

WO 2013076625, Dees; Walter, Method and Apparatus for Configuration and Control of Wireless Docking, May 2013, WIPO.*

(Continued)

*Primary Examiner* — Xin Jia
(74) *Attorney, Agent, or Firm* — Shumaker & Sieffert, P.A.

(57) ABSTRACT

This disclosure describes wireless communication techniques, protocols, methods, and devices applicable to a docking system environment in which aspects of wireless docking may function using vicinity-based undocking techniques. In some examples, the techniques of this disclosure enable a wireless docking center to undock a wireless dockee in a situation where a wireless dockee moves out of the vicinity of a wireless docking center so as to prevent malicious users from using peripheral devices available through the wireless docking center to interact with the wireless dockee without the wireless dockee user's knowledge. In other examples, the wireless dockee may undock itself from a wireless docking center when the wireless dockee moves out of the vicinity of a wireless docking center.

20 Claims, 6 Drawing Sheets

(56) References Cited

U.S. PATENT DOCUMENTS

2012/0099566 A1* 4/2012 Laine .................. H04M 1/7253
                                                                        370/338
2012/0317489 A1* 12/2012 Kuulusa .............. G06F 3/04883
                                                                        715/733
2014/0330998 A1* 11/2014 Dees ................. H04M 1/72527
                                                                        710/303

OTHER PUBLICATIONS

International Search Report and Written Opinion from International Application No. PCT/US2014/039408, dated Sep. 26, 2014, 10 pp.

* cited by examiner

VICINITY-BASED UNDOCKING FOR A WIRELESS DOCKING APPLICATION

This application claims the benefit of U.S. Provisional Application No. 61/835,370, filed Jun. 14, 2013, the entire content of which is incorporated by reference herein.

TECHNICAL FIELD

This disclosure relates to techniques for wireless docking between electronic devices.

BACKGROUND

Docking stations, which may also be referred to as "docks," are sometimes used to couple electronic devices such as laptop computers to peripherals such as monitors, keyboards, mice, printers, or other types of input or output devices. These docking stations typically require a physical connection between the electronic device and the docking station. Additionally, the electronic device and the docking station typically establish docking communications before docking functions may be used.

SUMMARY

This disclosure describes wireless communication techniques, protocols, methods, and devices applicable to a docking system environment in which aspects of wireless docking may function using vicinity-based undocking techniques. In some example, this disclosure proposes techniques whereby a wireless dockee or a wireless docking center may implement an undocking procedure based on a detected vicinity of the wireless dockee, for example, using a measured signal strength of a communication between the wireless dockee and the wireless docking center.

In one example, this disclosure describes a method for vicinity-based undocking in a wireless docking environment comprising measuring a signal strength of a communication between a wireless dockee and a wireless docking center, and undocking the wireless dockee from the wireless docking center based on the measured signal strength.

In another example, this disclosure describes a wireless dockee configured to perform vicinity-based undocking in a wireless docking environment, the wireless dockee comprising a wireless communication unit configured to communicate with a wireless docking center, a signal strength measuring unit configured to measure a signal strength of the communication between the wireless dockee and the wireless docking center, and an undocking determination unit configured to undock the wireless dockee from the wireless docking center based on the measured signal strength.

In another example, this disclosure describes a wireless docking center configured to perform vicinity-based undocking in a wireless docking environment, the wireless docking center comprising a wireless communication unit configured to communicate with a wireless dockee, a signal strength measuring unit configured to measure a signal strength of the communication between the wireless dockee and the wireless docking center, and an undocking determination unit configured to undock the wireless dockee from the wireless docking center based on the measured signal strength.

In another example, this disclosure describes an apparatus configured to perform vicinity-based undocking in a wireless docking environment, the apparatus comprising means for measuring a signal strength of a communication between a wireless dockee and a wireless docking center, and means for undocking the wireless dockee from the wireless docking center based on the measured signal strength.

In another example, this disclosure describes a computer-readable storage medium storing instructions that, when executed, cause one or more processors of a device configured to perform vicinity-based undocking to measure a signal strength of a communication between a wireless dockee and a wireless docking center, and undock the wireless dockee from the wireless docking center based on the measured signal strength.

The details of one or more examples are set forth in the accompanying drawings and the description below. Other features, objects, and advantages will be apparent from the description and drawings, and from the claims.

DETAILED DESCRIPTION

As described in greater detail below, this disclosure describes wireless communication techniques, protocols, methods, and devices applicable to a docking system environment in which aspects of wireless docking may function using vicinity-based undocking techniques. In some examples, the techniques of this disclosure enable a wireless docking center to undock a wireless dockee in a situation where a wireless dockee moves out of the vicinity of a wireless docking center so as to prevent malicious users from using peripheral devices available through the wireless docking center to interact with the wireless dockee without the wireless dockee user's knowledge. In other examples, the wireless dockee may undock itself from a wireless docking center when the wireless dockee moves out of the vicinity of a wireless docking center.

Figure 1:
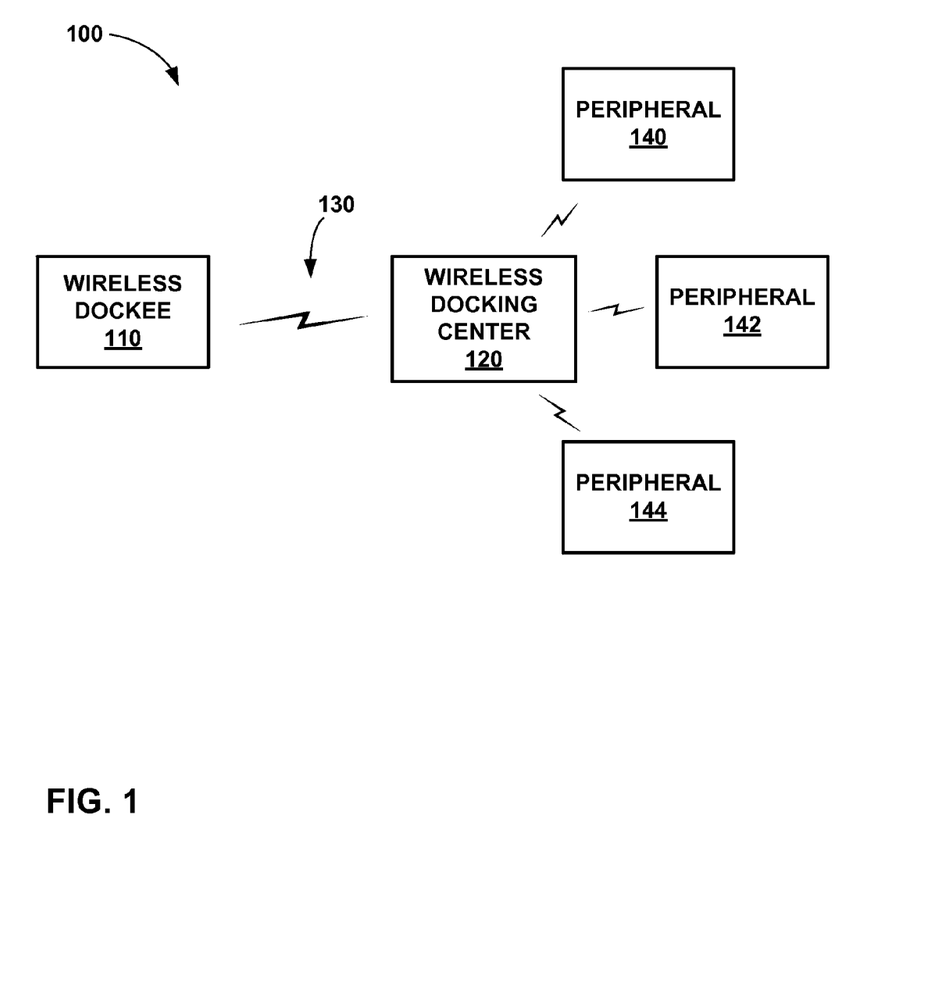
FIG. 1 is a conceptual diagram illustrating an example wireless docking environment in which a wireless dockee communicates with a wireless docking center over a wireless communication channel in accordance with examples of this disclosure.

FIG. 1 is a conceptual diagram of an example wireless docking environment 100 in which wireless dockee 110 communicates with a wireless docking center 120 over wireless communication channel 130. Wireless dockee 110 may be a mobile device configured for wireless docking and referred to as a wireless dockee in the context of a wireless docking environment 100. Wireless dockee 110 may be a mobile device such as a smartphone or other mobile handset, a tablet computer, a laptop computer, or any other electronic device capable of communicating wirelessly with WDC 120. Wireless dockee 110 may also be a component of a larger device or system. For example, wireless dockee 110 may be a processor, a processing core, a chipset, or one or more integrated circuits.

Wireless docking center 120 (which may also be referred to as a wireless docking station or wireless docking hub) may be communicatively coupled with various peripheral devices 140, 142, 144, which may provide a variety of services that wireless docking center 120 may advertise and/or make accessible to wireless dockee 110. Wireless docking center 120 may be a wireless docking host device that serves as a connectivity agent within a computing environment. Wireless docking center 120 may be a dedicated wireless dock, or may also be implemented in a smartphone or other mobile handset, a tablet computer, a laptop computer, desktop computer, or other electronic device, or as a component, subsystem, or one or more integrated circuits included as part of a larger device or system of any of the above.

Peripheral devices 140, 142, 144 may include displays, projectors, speakers, keyboards, mice, joysticks, data storage devices, network interface devices, other docking hosts, remote controls, cameras, microphones, printers, or any of various other devices capable of communication with wireless docking center 120. Peripheral devices 140, 142, 144 may be coupled to wireless docking center 120 via wired or wireless communication channels. Wireless docking center 120 may abstract the functions of individual peripheral devices 140, 142, 144 as wireless docking services.

Wireless communication channel 130 may be any channel capable of propagating communicative signals between wireless dockee 110 and wireless docking center 120. In some examples, wireless communication channel 130 may be implemented in radio frequency communications in frequency bands, such as the 2.4 gigahertz (GHz) band, the 5 GHz band, the 60 GHz band, or other frequency bands. In some examples, wireless communication channel 130 may comply with one or more sets of standards, protocols, or technologies, including, for example, Wi-Fi (as promoted by the Wi-Fi Alliance), WiGig (as promoted by the Wireless Gigabit Alliance), and/or the Institute of Electrical and Electronics Engineers (IEEE) 802.11 set of standards (e.g., 802.11, 802.11a, 802.11b, 802.11g, 802.11n, 802.11ac, 802.11ad, etc.), or other standards, protocols, or technologies. The frequency bands used for wireless communication channel 130, such as the 2.4 GHz, 5 GHz, and 60 GHz bands, may be defined for purposes of this disclosure as they are understood in light of the standards of Wi-Fi, WiGig, any one or more IEEE 802.11 protocols, and/or other applicable standards or protocols. In some examples, wireless dockee 110 may establish communication with wireless docking center 120 over wireless communication channel 130 automatically once wireless dockee 110 and wireless docking center 120 come within operative communication range of each other, or manually in response to a user input, in different examples.

As will be explained in more detail below, one or more of wireless dockee 110 and wireless docking center 120 may be configured to undock with each other using the techniques of this disclosure. The undocking process of this disclosure may be predicated on a distance between wireless dockee 110 and wireless docking center 120 (i.e., whether or not wireless dockee 110 is still within the vicinity of wireless docking center 120).

Figure 2:
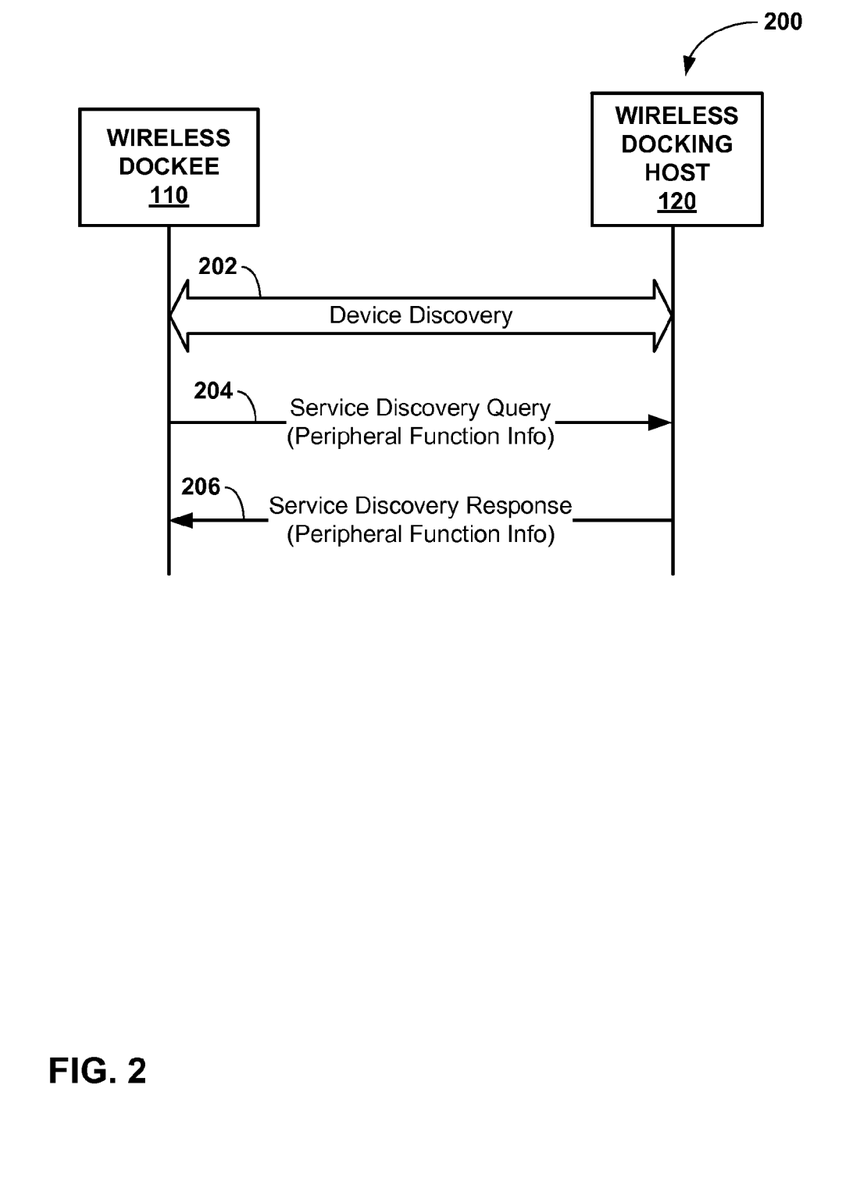
FIG. 2 is a communication diagram illustrating an example procedure for a communication flow between a dockee and a docking center to exchange initial wireless communications with each other prior to establishing a wireless docking session with each other, in accordance with some examples of this disclosure.

FIG. 2 is a communication diagram illustrating an example procedure 200 for a communication flow between wireless dockee 110 and wireless docking center 120 to exchange initial wireless communications with each other prior to establishing a wireless docking session with each other, in accordance with some examples of this disclosure. The procedure 200 for discovery and initial communication provides for wireless dockee 110 to query wireless docking center 120 for what peripheral functions wireless docking center 120 has access to and might make accessible to wireless dockee 110, from among the peripherals coupled to wireless docking center 120. This procedure 200 may be referred to as Peripheral Function Discovery.

As shown in the communication flow in FIG. 2, wireless docking center 120 and wireless dockee 110 may initially exchange device discovery communications (202). Wireless dockee 110 may send a service discovery query to query wireless docking center 120 for peripheral function information (204), or information on peripheral functions available to wireless docking center 120. Applicable peripheral functions may be available to wireless docking center 120 from any of one or more peripheral devices coupled to wireless docking center 120, as described above with peripheral devices 140, 142, 144 in the context of FIG. 1. Wireless docking center 120, serving as a wireless docking host, may send a service discovery response that provides its peripheral function information (206). Wireless docking center 120 may thereby advertise its peripheral functions in pre-association service discovery communications (204, 206) with wireless dockee 110. These communications are pre-association in that they take place prior to initiation of a wireless docking session between wireless dockee 110 and wireless docking center 120. Wireless dockee 110 may thus discover the peripheral functions associated with wireless docking center 120 from the service discovery response 206 as part of the pre-association service discovery communications shown in FIG. 2. Additional details of these pre-association service discovery communications 204, 206 are provided below.

The device discovery communications 202 and the service discovery communications 204, 206 as shown in FIG. 2 may be implemented in Data Link Layer, or layer 2 (L2), communications. The L2 communications may be conveyed over any of various types of physical layer (PHY) communication channels, including any of the Wi-Fi or WiGig standards and/or IEEE 802.11 protocols as discussed above. The service discovery query 204 sent by wireless dockee 110 and the service discovery response 206 sent by wireless docking center 120 may use service discovery action frames. An example action frame may include a Media Access Control (MAC) header, a frame category, action details, and a frame check sequence (FCS). The action details in the service discovery query 204 sent by wireless dockee 110 may include object identifier (OI) fields and query data fields. Wireless dockee 110 may set an OI field in the service discovery action frame to 0x506F9A, i.e., the Organizationally Unique Identifier (OUI) of the Wi-Fi Alliance (WFA). Wireless dockee 110 may also set additional fields in the service discovery action frame, such as an OUI subtype field and a service protocol type field. Wireless dockee 110 may set the query data field of the service discovery query action frame to include a list of docking sub-element identifiers (ID's) to query for information on available docking sub-elements. In some examples, wireless dockee 100 may communicate with wireless docking center 120 using plain-text payloads that include SOAP requests and responses (e.g., in accordance with the SOAP specification defined at www.w3.org/TR/soap12-part1) and GENA (General Event Notification Architecture) notifications running on a packet-based transport layer protocol stack, while in other examples, wireless dockee 100 may communicate with wireless docking center 120 using a binary protocol running on a packet-based transport layer protocol stack, as further described below. Wireless dockee 110 may also set a service transaction identifier (ID) in the query data field. Examples of the query data fields and the docking sub-element ID's for examples using SOAP and GENA payloads are shown as follows in Tables 1 and 2.

TABLE 1

Query Data Fields

| Field | Length (Octets) | Description |
| --- | --- | --- |
| List of Docking Sub-element IDs | Variable | Requested Docking sub-elements as an array of sub-element IDs as per Table 2. |

TABLE 2

Docking Sub-element IDs

| Docking Sub-element ID | Description |
| --- | --- |
| . . . | . . . |
| 7 | Peripheral Function Information |
| 8 | Docking Host SOAP URL |
| 9 | Docking Host GENA URL |
| 10-255 | Reserved |

In some examples that may use a binary protocol instead of SOAP and GENA payloads, wireless dockee 100 may communicate with wireless docking center 120 without requiring the use of docking sub-element ID's 8 and 9 as listed in Table 2.

Wireless docking center 120 may respond to receiving service discovery query 204 from wireless dockee 110 by sending service discovery response 206. Wireless docking center 120 may include in service discovery response 206 a service discovery action frame with a service response data field that includes a list of requested docking sub-elements. Wireless docking center 120 may include a service transaction ID in the service response type-length-value (TLV) element that matches the service transaction ID in the query data field of the service discovery query 204 from wireless dockee 110, to ensure that wireless dockee 110 can associate the service discovery response 206 with the service discovery query 204. Wireless docking center 120 may set a docking information element (IE) in Docking Service Discovery action frames included in the service discovery response 206. In some examples, wireless docking center 120 may set the docking IE to include sub-elements as shown as follows in Table 3.

TABLE 3

Information Sub-elements in Docking IE in Docking Service Discovery Response

| Sub-element Name | Requirements |
| --- | --- |
| . . . | . . . |
| Peripheral Function Information | If requested, the Peripheral Function Information sub-element may be present in the Docking IE in the Docking Service Discovery Response action frames that docking host 120 transmits. |

TABLE 3-continued

Information Sub-elements in Docking IE in Docking Service Discovery Response

| Sub-element Name | Requirements |
| --- | --- |
| Docking Host SOAP URL | If requested, the Docking Host SOAP URL sub-element may be present in the Docking IE in the Docking Service Discovery Response action frames that docking host 120 transmits. |
| Docking Host GENA URL | If requested, the Docking Host SOAP URL sub-element may be present in the Docking IE in the Docking Service Discovery Response action frames that docking host 120 transmits. |
| . . . | . . . |

These docking information sub-elements provided by the wireless docking center 120 in service discovery response 206, i.e., the Peripheral Function Information Sub-element, the Docking Host SOAP Uniform Resource Locator (URL) Sub-element, and the Docking Host General Event Notification Architecture (GENA) URL Sub-element, are further described as follows. In examples that use a binary protocol, wireless docking center 120 may omit the docking host SOAP URL and docking host GENA URL from the information sub-elements from the docking information element in the docking service discovery response. In some examples that use the SOAP and GENA payloads, wireless dockee 110 and wireless docking center 120 may both send SOAP requests and responses to each other, and wireless docking center 120 may send GENA notifications to wireless dockee 110, where both the SOAP and GENA payloads may be sent over a packet-based transport layer protocol stack, in accordance with specifications such as Transmission Control Protocol/Internet Protocol (TCP/IP) or User Datagram Protocol/IP (UDP/IP), for example, to specified URLs, and potentially also to specified port numbers, such as TCP port number 80 (commonly associated with HTTP).

The Peripheral Function Information sub-element may provide the peripheral function (PF) information of peripherals hosted by wireless docking center 120. The Peripheral Function Information sub-element may have a data structure as shown in Table 4, with additional information on the listed fields thereafter.

TABLE 4

Peripheral Function Information Sub-element

| Field | Length (Octets) | Type |
| --- | --- | --- |
| n_PFs | 1 | uimsbf |
| for (i = 0; i < n_PFs; i++) { | | |
|     PF_ID | 2 | uimsbf |
|     PF_type | 2 | uimsbf |
|     PF_name | Variable | UTF-8_String( ) |
|     PF_capability | Variable | UTF-8_String( ) |
|     PF_state | 1 | uimsbf |
|     n_PFPs | 1 | uimsbf |
|     for (i = 0; I < n_PFPs; i++) { | | |
|         PFP_ID | 1 | uimsbf |
|     } | | |
| } | | |

The field "n_PFs" may contain the number of peripheral functions (PF's) hosted by wireless docking center 120 that generate this PF Status information data structure. Any one or more peripheral device coupled to wireless docking center 120 (e.g., peripheral devices 140, 142, 144 of FIG. 1) may provide one or more peripheral functions.

The field "PF_ID" may contain the ID of a particular peripheral function (PF). As indicated by the line "for (i=0; i<n_PFs; i++)," the peripheral function information sub-element may include a peripheral function ID and associated information for each peripheral function ID for each of the "n_" peripheral functions. The peripheral function ID may be unique for all peripheral functions that wireless docking center 120 currently hosts or centers or has ever hosted or centered. Wireless docking center 120 may specify when a peripheral function is new and when the peripheral function is not new (e.g., when a mouse that provides a mouse peripheral function has been replaced by another mouse that may provide a mouse peripheral function).

The field "PF_type" may indicate the peripheral function type of the peripheral function. An illustrative set of peripheral function types is listed below in Table 5.

The field "PF_name" may contain a user-friendly name of the peripheral function. This peripheral function name may be unique for all PFs available to wireless docking center 120. The format of the peripheral function name may be a UTF-8_String( ) structure, in some examples.

The field "PF_capability" may contain the capability of the peripheral function as reported by wireless docking center 120. The format of the peripheral function capability may also be a UTF-8_String( ) structure, in some examples.

The field "n_PFPs" may contain the number of Peripheral Function Protocols that can be used to support the use of the particular peripheral referred to by a given PF ID. The field "PFP ID" may contain the identifier (ID) of the Peripheral Function Protocol that can be used to support the use of the particular peripheral. An illustrative set of peripheral function protocols is listed below in Table 6. The field "PF_state" may contain the state of the peripheral function, such as with the example states defined below in Table 7.

TABLE 5

Peripheral Function Type

| PF Type | Description |
| --- | --- |
| 0 | Mouse |
| 1 | Keyboard |
| 2 | Remote Control |
| 3 | Display |
| 4 | Speaker |
| 5 | Microphone |
| 6 | Storage |
| 7 | Joystick |
| 8-65535 | Reserved |

TABLE 6

Peripheral Function Protocol Identifier

| PFP ID | Description |
| --- | --- |
| 0 | Miracast |
| 1 | WiFi Serial Bus (WSB) |
| 2 | Bluetooth |
| 3 | WiGig Display Extension (WDE) |
| 4 | WiGig Serial Extension (WSE) |
| 5-255 | Reserved |

TABLE 7

PF_state values

| State | Value | Description |
| --- | --- | --- |
| DISCONNECTED | 0x01 | The PF cannot be reached by its managing wireless docking center (WDH, e.g., docking center 120) and its managing WDH has no further information on how to make it available for docking. |
| SLEEP | 0x02 | The PF has let its managing WDH known that it is going to low-power mode or to be switched-off and that user action on the PF is required to make the PF available for docking again. On the other hand, if a PF can be woken up without requiring user action (e.g. through Wake-on-LAN or by changing the USB power state), the PF may not be given the PF_state "SLEEP". Such PFs may be given the state "NOT PAIRED" or "AVAILABLE". |
| NOT_PAIRED | 0x03 | The only thing that needs to be done for making this PF available for docking is that a user action is needed for pairing the PF with its managing WDH. |
| AVAILABLE | 0x04 | The PF is available for docking. |
| NOT_AVAILABLE | 0x05 | The PF is not available for docking. |

The Docking Host SOAP URL sub-element provides the URL of the SOAP command service for the docking protocol provided by wireless docking center 120. The Docking Host SOAP URL sub-element may have the data structure shown as follows in Table 8.

TABLE 8

Docking Host SOAP URL Sub-element

| Field | Length (Octets) | Type | Description |
|---|---|---|---|
| port_num | 2 | uimsbf | Port number |
| URL_path | Variable | UTF-8_String( ) | Substring of URL path, percent-encoded as per Internet Engineering Task Force (IETF) Request for Comment (RFC) 3986 |

The Docking Host GENA URL sub-element provides the URL of the GENA notification service for the docking protocol provided by wireless docking center 120. The Docking Host GENA URL sub-element may have the data structure shown as follows in Table 9.

TABLE 9

Docking Host GENA URL Sub-element

| Field | Length (Octets) | Type | Description |
|---|---|---|---|
| port_num | 2 | uimsbf | Port number |
| URL_path | Variable | UTF-8_String( ) | Substring of URL path, percent- encoded as per IETF RFC 3986 |

In accordance with the techniques of this disclosure, wireless dockee (WD) 110 and wireless docking center (WDC) 120 may also be configured to undock with each other. The undocking process of this disclosure may be predicated on a determined distance between WD 110 and WDC 120 (i.e., whether or not the WD 110 is still within the vicinity of WDC 120).

In the context of this disclosure, a WD 110 is "out of the vicinity" of a WDC 120 when the WD 110 is physically away from the peripherals connected through the WDC 120 to an extent that it is unlikely that the user of the WD 110 is still in control of or using the peripherals. As such, also in the context of this disclosure, an operation (whether in WD 110, WDC 120, or both) that performs an undocking process based on this "out of the vicinity" condition is referred to as vicinity-based undocking.

This disclosure describes two general techniques of vicinity-based undocking One technique is WD centric (i.e., performed almost completely by the WD 110), and the other technique is WDC assisted (i.e., performed through operations by WDC 120 or both WD 110 and WDC 120).

Figure 3:
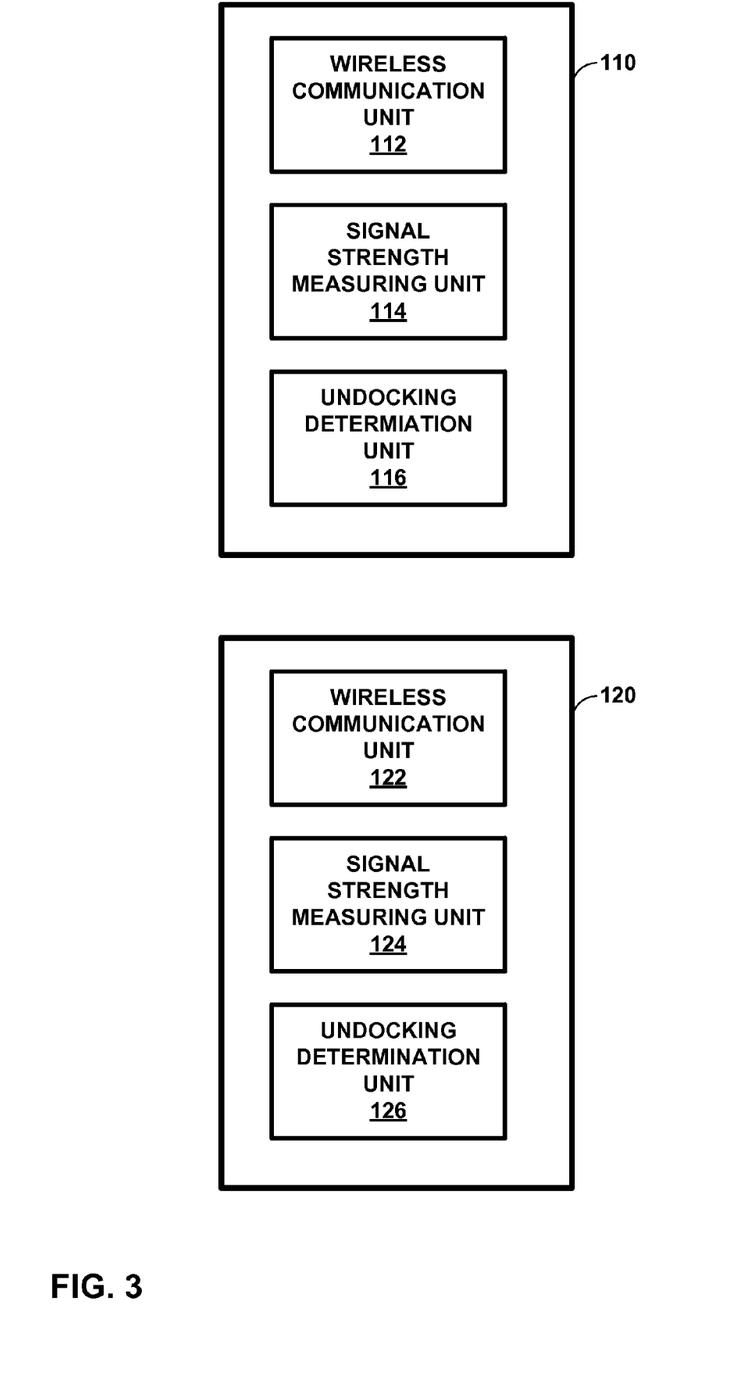
FIG. 3 is a block diagram showing an example wireless dockee and wireless docking center configured to implement the techniques of this disclosure.

FIG. 3 is a block diagram showing an example wireless dockee and wireless docking center configured to implement the techniques of this disclosure. For the WD-centric vicinity-based undocking, WD 110 is configured to determine on its own when to undock from WDC 120 due to a determination that WD 110 is out of the vicinity of WDC 120. In one example WD-centric vicinity-based undocking technique, no messaging between WD 110 and WDC 120 is required. Instead, WD 110 makes a determination to undock based on a measured signal strength between WD 110 and WDC 120 (e.g., the strength of the signal on wireless communication channel 130 of FIG. 1).

In one example, WD 110 may include a wireless communication unit 112, a signal strength measuring unit 114, and an undocking determination unit 116. Wireless communication unit 112 may comprise one or more processors and a transceiver configured to communicate with WDC 120, for example, using any of the above communication techniques described above with reference to FIG. 1. WD 110 may further include a signal strength measuring unit 114 that may be configured to measure a received signal strength indication (RSSI) for the communication protocol used to communicate with WDC 120 over communication channel 130 (e.g., through wireless communication unit 112). Signal strength measuring may be implemented as one or more processors, or any other hardware capable of measuring the strength of a signal received by wireless communication unit 112 from WDC 120.

As discussed above, in on example, signal strength measuring unit 114 may be configured to measure the RSSI of the received signal. RSSI is a measurement of power in a received radio signal. When the measured RSSI drops below a first threshold value (i.e., a lower threshold value), undocking determination unit 116 of WD 110 is configured to start an undocking timer to prepare for undocking. Undocking determination unit 116 may be implemented through one or more processors and/or dedicated hardware. If signal strength measuring unit 114 of WD 110 measures an RSSI at a value higher than a second threshold (i.e., a higher threshold value), before the timer expires, undocking determination unit 116 cancels the undocking procedure, stops the timer, and WD 110 remains docked with WDC 120. The difference between the first, lower threshold value and the second, higher threshold value serves as a hysteresis to prevent the ping-pong effect. That is, if only one threshold value for RSSI were used to stop and start the undocking timer, it is possible that the RSSI may fluctuate across this threshold many times, causing frequent starting and stopping of undocking timers. By providing a gap between the lower threshold (to start the undocking timer) and the higher threshold (to stop the undocking timer), such a ping-pong effect is mitigated. If the timer expires before the occurrence of any RSSI measurement above the higher threshold value, undocking determination unit 116 undocks WD 110 from WDC 120.

Once undocked from WDC 120, WD 110 is no longer able to use any peripheral devices available through WDC 120. WD 110 would need to re-dock to WDC 120 (e.g., using the techniques described above with reference to FIG. 2) to again use any peripheral devices available through WDC 120. Likewise, once WD 110 is undocked from WDC 120, peripheral devices available through WDC 120 would not be able to interact with WD 110. Thus, preventing a malicious user from interacting with WD 110 through a peripheral device without the knowledge of the user of WD 110.

In some circumstances, WD 110 may not be capable of WD-centric vicinity-based undocking (e.g., if WD 110 is not configured to measure an RSSI). In this example, the disclosure proposes an additional/optional procedure performed by WDC 120 to assist in vicinity-based undocking. This technique of the disclosure may be called WDC-assisted vicinity-based undocking. In this example, WDC 120 is configured to measure the RSSI of the communication signal between WD 110 and WDC 120.

Referring back to FIG. 3, WDC 120 may include a wireless communication unit 122, a signal strength measuring unit 124, and an undocking determination unit 126. Wireless communication unit 122 may comprise one or more processors and a transceiver configured to communicate with WD 110, for example, using any of the above communication techniques described above with reference to FIG. 1. WDC 120 may further include a signal strength measuring unit 124 that may be configured to measure a received signal strength indication (RSSI) for the communication protocol used to communicate with WD 110 over communication channel 130 (e.g., through wireless communication unit 122). Signal strength measuring may be implemented as one or more processors, or any other hardware capable of measuring the strength of a signal received by wireless communication unit 122 from WD 110.

In the example of WDC-assisted vicinity-based undocking, when signal strength measuring unit 124 of WDC 120 measures that the RSSI has dropped below a lower threshold value, undocking determination unit 126 is configured to send a message (e.g., through wireless communication unit 122) to inform WD 110 that an undocking procedure is beginning and undocking determination unit 126 starts an undocking timer to prepare for undocking WD 110 may display this message to a user to inform the user of the pending undocking, thus allowing the user to move to a closer vicinity to prevent undocking. Undocking determination unit 126 may be implemented through one or more processors and/or dedicated hardware. If the timer expires, undocking determination unit 126 undocks WD 110. If signal strength measuring unit 124 measures an RSSI at a value above a higher threshold value, undocking determination unit 126 cancels the undocking timer. Again, the difference between the lower value and the higher value serves as hysteresis to prevent the ping pong effect.

Figure 4:
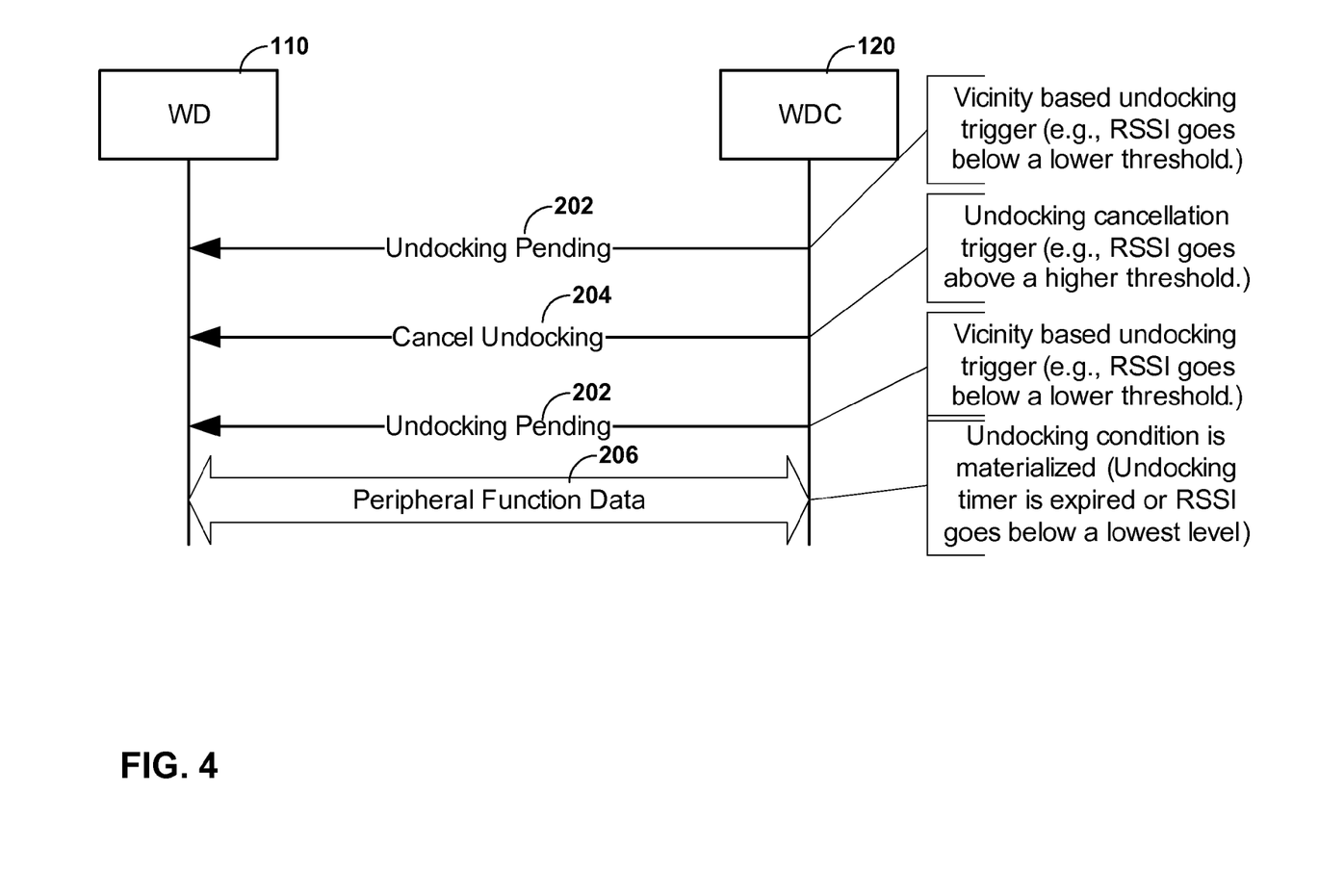
FIG. 4 shows an example call flow for a wireless docking center assisted vicinity-based undocking procedure according to the techniques of this disclosure.

FIG. 4 shows an example call flow for a WDC-assisted vicinity-based undocking procedure. As shown in FIG. 4, while docked, peripheral function data 206 is communicated between WD 110 and WDC 120. Peripheral function data 206 may be any data, syntax, handshaking, etc., which may be used by WD 110 and peripheral devices available through WDC 120.

In WDC-assisted vicinity-based undocking, undocking pending message 202 may be signaled from WDC 120 to WD 110 based on a signal strength trigger (e.g., WDC 120 measure an RSSI below a lower threshold). WDC 120 is configured to start an undocking timer based on the measured RSSI below the lower threshold. If WDC 120 detects an RSSI above a higher threshold, cancel undocking message 204 is sent to WD 110 and the undocking timer is stopped. A new undocking pending message 202 may be sent to WD 110 if a measured RSSI subsequently goes below the lower threshold, and the undocking timer may be restarted. If the undocking timer expires, WDC 120 undocks from WD 110 and peripheral function data 206 communication ceases.

Both WDC 120 and WD 110 may use a Normalized RSSI (NRSSI) to estimate whether or not WD 110 is within the vicinity of WDC 120. The NRSSI is defined as the currently detected RSSI divided by a reference RSSI. The reference RSSI value may be selected based on 1) the maximum working distance for an active docking session expected by user and 2) the RSSI detected in field tests for such maximum distance.

In one example, the NRSSI Threshold Upper, NRSSI_TU may be set at 0.6 and the NRSSI Threshold Lower, NRSSI_TL may be set at 0.5. Regardless of actual value, the upper threshold is set to be greater than the lower threshold, i.e., set NRSSI_TU>NRSSI_TL.

Figure 5:
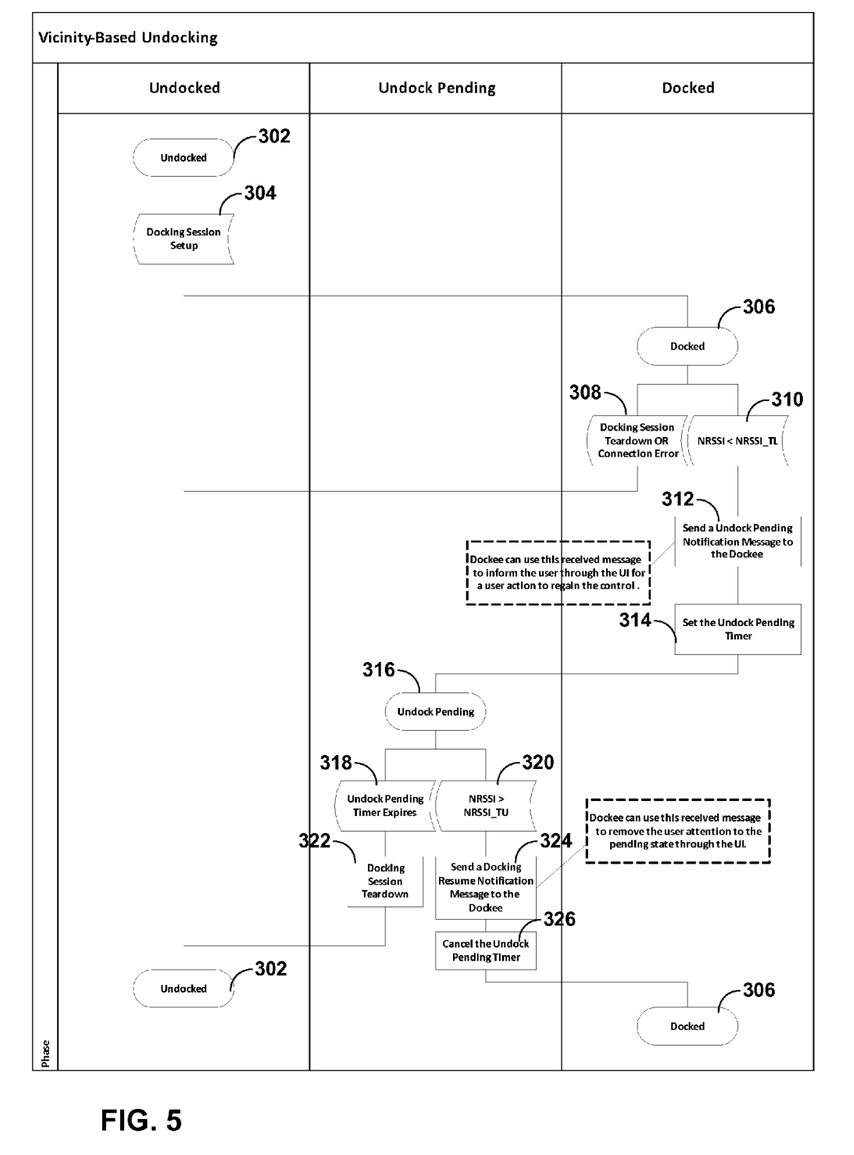
FIG. 5 is an example state machine showing an example wireless docking center assisted vicinity-based undocking procedure according to the techniques of the disclosure.

FIG. 5 is an example state machine showing an example WDC-assisted vicinity-based undocking procedure in more detail. The left column of FIG. 5 represents the states of a wireless docking environment (i.e., WD 110 and WDC 120), when WD 110 and WDC 120 are undocked. The center column shows the states when undocking is pending. The right column shows the states when WD 110 and WDC 120 are docked.

Initially, WD 110 and WDC 120 are in undocked state 302. Docking may be accomplished through docking session setup 304, for example, using the techniques described above with reference to FIG. 2. However, any techniques for establishing docking may be used. Once docked, WD 110 and WDC 120 are in docked state 306, thus allowing WD 110 to interact with and use peripheral devices 140, 142, and 144 available through WDC 120. WD 110 and WDC 120 remain in docked state 306 until undocking is triggered. In one example, conventional undocking triggers may be used, such as docking session teardown or connection error 308. Docking session teardown may be a manual undocking request by WD 110. Connection error may occur when communication is lost between WD 110 and WDC 120. Should docking session teardown or connection error 308 occur, WD 110 and WDC 120 return to undocked state 302.

Based on the techniques of this disclosure, another trigger for undocking WD 110 and WDC 120 may involve measuring a signal strength (e.g., NRSSI) of the communication between WD 110 and WDC 120. In state 310, WDC 120 measures that NRSSI is below a lower threshold (NRSSI_TL). In other examples, as described above, WD 110 may be configured to measure the signal strength. Based on the measurement of the NRSSI below the lower threshold, WDC 120 sends an undocking pending notification message 312 to WD 110. WD 110 may display this message to a user to inform the user of the pending undocking, thus allowing the user to move to a closer vicinity to prevent undocking.

After sending notification 312, WDC 120 starts an undocking pending timer 314 and WD 110 and WDC 120 move to an undocking pending state 316. If the undocking pending timer expires (state 318), WD 110 and WDC 120 move to docking session teardown state 322, and eventually, undocked state 302. However, if WDC 120 measures that the NRSSI moves above a higher threshold (NRSSI_TU) 320, WDC 120 may send a docking resume notification message 324 to WD 110. WD 110 may display this message to a user of WD 110 to inform the user that docking may continue. Such a message may also be used to remove the undocking pending message 312. WDC 120 then cancels the undocking pending timer 326 and WD 110 and WDC 120 return to docked state 306.

Figure 6:
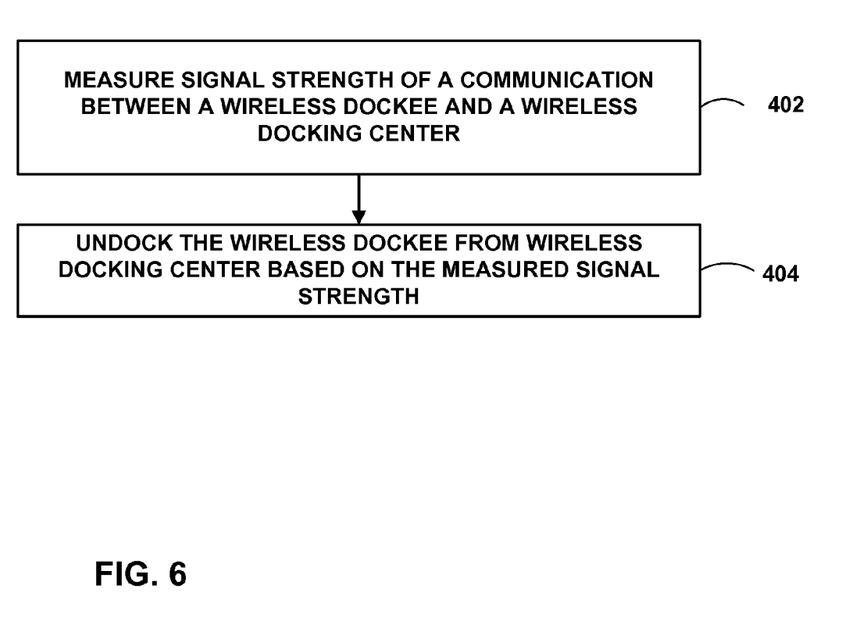
FIG. 6 is a flowchart illustrating an example method in accordance with examples of this disclosure.

FIG. 6 is a flowchart showing an example method according to the techniques of the disclosure. The method of FIG. 4 may be carried out by either WD 110 or WDC 120.

In one example of the disclosure, a method for vicinity-based undocking in a wireless docking environment comprises measuring a signal strength of a communication between a wireless dockee and a wireless docking center (402), and undocking the wireless dockee from the wireless docking center based on the measured signal strength (404). In one example, the measured signal strength is a normalized received signal strength indication (NRSSI).

In one example, either WD 110 or WDC 120 may be configured to undock the wireless dockee from the wireless docking center based on the measured signal strength using the following steps. WD 110 or WDC 120 starts a timer if the measured signal strength is below a lower threshold. WD 110 or WDC 120 continues measuring the signal strength of the communication between the wireless dockee and the wireless docking center. WD 110 or WDC 120 stops the timer in the case that the measured signal strength is above a higher threshold, whereby the wireless dockee and the wireless docking center remain docked, and wherein the higher threshold has a higher value that the lower threshold. WD 110 or WDC 120 undocks the wireless dockee from the wireless docking center in the case that the timer expires.

In another example, WDC 120 may be configured to undock the wireless dockee from the wireless docking center based on the measured signal strength using the following steps. WDC 120 starts a timer if the measured signal strength is below a lower threshold. WDC 120 sends a message from WDC 120 to the wireless dockee indicating that undocking is pending. WDC 120 continues measuring the signal strength of the communication between the wireless dockee and WDC 120. WDC 120 stops the timer in the case that the measured signal strength is above a higher threshold, whereby the wireless dockee and WDC 120 remain docked, and wherein the higher threshold has a higher value that the lower threshold. WDC 120 undocks the wireless dockee from WDC 120 in the case that the timer expires.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for vicinity-based undocking in a wireless docking environment, the method comprising:
measuring a signal strength of a communication between a wireless dockee and a wireless docking center;
starting a timer if the measured signal strength is below a lower threshold, wherein the lower threshold represents a first signal strength value indicating the wireless dockee is out of range of the wireless docking center;
continuing measuring the signal strength of the communication between the wireless dockee and the wireless docking center while the timer is running;
stopping the timer in the case that the measured signal strength is above a higher threshold, wherein the wireless dockee and the wireless docking center remain docked, wherein the higher threshold represents a second signal strength value indicating the wireless dockee is in range of the wireless docking center, and wherein the higher threshold has a higher value than the lower threshold; and
undocking the wireless dockee from the wireless docking center in the case that the timer expires.

2. The method of claim 1, wherein the measured signal strength is a normalized received signal strength indication (NRSSI).

3. The method of claim 1, further comprising:
sending a message from the wireless docking center to the wireless dockee indicating that undocking is pending.

4. The method of any of claim 1, 2 or 3, wherein the method is performed by the wireless docking center.

5. The method of any of claim 1 or 2, wherein the method is performed by the wireless dockee.

6. A wireless dockee configured to perform vicinity-based undocking in a wireless docking environment, the wireless dockee comprising:
a transceiver configured to communicate with a wireless docking center; and
one or more processors configured to:
measure a signal strength of the communication between the wireless dockee and the wireless docking center;
start a timer if the measured signal strength is below a lower threshold, wherein the lower threshold represents a first signal strength value indicating the wireless dockee is out of range of the wireless docking center;
continue measuring the signal strength of the communication between the wireless dockee and the wireless docking center while the timer is running;
stop the timer in the case that the measured signal strength is above a higher threshold, wherein the wireless dockee and the wireless docking center remain docked, wherein the higher threshold represents a second signal strength value indicating the wireless dockee is in range of the wireless docking center, and wherein the higher threshold has a higher value than the lower threshold; and
undock the wireless dockee from the wireless docking center in the case that the timer expires.

7. The wireless dockee of claim 6, wherein the measured signal strength is a normalized received signal strength indication (NRSSI).

8. A wireless docking center configured to perform vicinity-based undocking in a wireless docking environment, the wireless docking center comprising:
a transceiver configured to communicate with a wireless dockee; and
one or more processors configured to:
measure a signal strength of the communication between the wireless dockee and the wireless docking center;
start a timer if the measured signal strength is below a lower threshold, wherein the lower threshold represents a first signal strength value indicating the wireless dockee is out of range of the wireless docking center;
continue measuring the signal strength of the communication between the wireless dockee and the wireless docking center while the timer is running;
stop the timer in the case that the measured signal strength is above a higher threshold, wherein the wireless dockee and the wireless docking center remain docked, wherein the higher threshold represents a second signal strength value indicating the wireless dockee is in range of the wireless docking center, and wherein the higher threshold has a higher value than the lower threshold; and
undock the wireless dockee from the wireless docking center in the case that the timer expires.

9. The wireless docking center of claim 8, wherein the measured signal strength is a normalized received signal strength indication (NRSSI).

10. The wireless docking center of claim 8, wherein the one or more processors are further configured to:
send a message to the wireless dockee indicating that undocking is pending.

11. An apparatus configured to perform vicinity-based undocking in a wireless docking environment, the apparatus comprising:
means for measuring a signal strength of a communication between a wireless dockee and a wireless docking center;
means for starting a timer if the measured signal strength is below a lower threshold, wherein the lower threshold represents a first signal strength value indicating the wireless dockee is out of range of the wireless docking center;
means for continuing measuring the signal strength of the communication between the wireless dockee and the wireless docking center while the timer is running;
means for stopping the timer in the case that the measured signal strength is above a higher threshold, wherein the wireless dockee and the wireless docking center remain docked, wherein the higher threshold represents a second signal strength value indicating the wireless dockee is in range of the wireless docking center, and wherein the higher threshold has a higher value than the lower threshold; and
means for undocking the wireless dockee from the wireless docking center in the case that the timer expires.

12. The apparatus of claim 11, wherein the measured signal strength is a normalized received signal strength indication (NRSSI).

13. The apparatus of claim 11, further comprising:
means for sending a message from the wireless docking center to the wireless dockee indicating that undocking is pending.

14. The apparatus of any of claim 11, 12, or 13, wherein the apparatus is the wireless docking center.

15. The apparatus of any of claim 11 or 12, wherein the apparatus is the wireless dockee.

16. A non-transitory computer-readable storage medium storing instructions that, when executed, cause one or more processors of a device configured to perform vicinity-based undocking to:
measure a signal strength of a communication between a wireless dockee and a wireless docking center;
start a timer if the measured signal strength is below a lower threshold, wherein the lower threshold represents a first signal strength value indicating the wireless dockee is out of range of the wireless docking center;
continue measuring the signal strength of the communication between the wireless dockee and the wireless docking center while the timer is running;
stop the timer in the case that the measured signal strength is above a higher threshold, wherein the wireless dockee and the wireless docking center remain docked, wherein the higher threshold represents a second signal strength value indicating the wireless dockee is in range of the wireless docking center, and wherein the higher threshold has a higher value than the lower threshold; and
undock the wireless dockee from the wireless docking center in the case that the timer expires.

17. The non-transitory computer-readable storage medium of claim 16, wherein the measured signal strength is a normalized received signal strength indication (NRSSI).

18. The non-transitory computer-readable storage medium of claim 16, wherein the instructions further cause the one or more processors to:
send a message from the wireless docking center to the wireless dockee indicating that undocking is pending.

19. The non-transitory computer-readable storage medium of any of claim 16, 17, or 18, wherein the device is the wireless docking center.

20. The non-transitory computer-readable storage medium of any of claim 16 or 17, wherein the device is the wireless dockee.

\* \* \* \* \*